Patented Oct. 18, 1938

2,133,480

UNITED STATES PATENT OFFICE 2,133,480

PRODUCTION OF ETHERS SUITABLE AS DISPERSING AGENTS AND OF PREPARATIONS THEREFROM

Conrad Schoeller and Joseph Nuesslein, Ludwigshafen-on-the-Rhine, Germany, assignors to I. G. Farbenindustrie Aktiengesellschaft, Frankfort-on-the-Main, Germany No Drawing. Application December 22, 1932, Serial No. 648,446. In Germany January 2, 1932

4 Claims. (Cl. 260—615)

The present invention relates to the production of ethers suitable as dispersing agents and of preparations therefrom.

It is already known that hydroxyalkyl ethers of polyhydric and lower monohydric alcohols may be obtained by the action of ethylene oxide on the said alcohols.

We have now found that valuable assistants for the textile and related industries and particularly for the preparation of dispersions are obtained by converting, in known manner, aliphatic monohydric alcohols containing at least eight carbon atoms in their molecule into their ethers with ethylene glycol or di- or tri-ethylene glycols. The said products are usually soluble or easily dispersible in water, so that they may be used as such, but, if a particularly high solubility in water be desired, it is advantageous when using them in the textile or related industries to combine them with dispersing agents.

The said ethers with the said glycols or mixtures of the ethers of di- and tri-ethylene glycols are obtained for example in a simple manner by warming alcohols of high molecular weight, as for example octyl, decyl, dodecyl, cetyl, octodecyl or oleyl alcohols or mixtures thereof, in a pressure-tight vessel with corresponding amounts of ethylene oxide while employing condensation catalysts, such as surface active substances as for example bleaching earths or active charcoal, strongly acid substances as for example sulphuric or phosphoric acids or sodium or potassium bisulphates, or also strongly alkaline agents such as caustic soda or alkali metal alcoholates. The temperatures are generally between about 80° and about 200° C. If the quantities of ethylene oxide and of alcohols do not correspond to stoichiometrical proportions, mixtures of the ethers may be obtained in which the ethers of ethylene glycol, di- or tri-ethylene glycols will prevail. The ethers may also be prepared by etherifying the said alcohols with ethylene glycol or di- or tri-ethylene glycols, or for example by causing ethylene halogen hydrins to act on the alcohols of high molecular weight. The alcohols of high molecular weight may be chosen from octyl, decyl, undecyl, dodecyl, tetradecyl, cetyl, octodecyl, undecenyl and oleyl alcohols. In some cases diethers of the alcohols with the glycols may be formed together with the mono-ethers, which di-ethers, or mixtures thereof, with the mono-ethers, may also serve for the same purposes as the mono-ethers though the latter are generally preferred.

The products prepared in the said manner are especially suitable as softening agents for textiles of all kinds, as for example those from artificial silk, cotton, wool, natural silk or bast-fibres or from mixtures thereof because they impart to the treated goods a soft and supple touch. They may also be employed with advantage for greasing wool as well as for dressing any fabrics. In washing, bucking, fulling and dyeing liquors they frequently effect a rapid and uniform penetration of the treatment liquid, especially the ethers of di- or tri-ethylene glycols. Their capabilities of employment are considerably enhanced by the fact that they chemically react entirely neutral and, contrasted with soaps and Turkey-red oils, give no deposits of insoluble salts even when employed in water containing lime.

The said ethers may be employed alone or together with other assistants usual in the textile, leather, paper, lacquer, pharmaceutical and cosmetic industries, and in the production of insecticides. For example they may be employed in admixture with soapy substances, such as soaps, Turkey-red oils, sulphuric esters or true sulphonic acids of organic compounds of high molecular weight or water-soluble salts of the sulphonated compounds, or in admixture with glue, gelatine, gum arabic or with organic more or less water-insoluble solvents, such as carbon tetra-chloride, trichlorethylene, cyclohexanol, cyclohexanone and the phenyl, cresyl or xylyl ethers of ethylene glycol, or the like. They are especially suitable for the preparation of dispersions of oily and fatty substances which are insoluble or only soluble with difficulty in water, such as fats, waxes, aliphatic alcohols of high molecular weight, paraffin waxes or mineral oils, the dispersions obtained being also useful as pest-destroying or combating agents. The said ethers may be directly mixed with fats, oils or waxes to give preparations which are readily dispersible in water. Ethers of alcohols containing from 12 to 18 carbon atoms, as for example dodecyl-di- or tri-ethylene glycol ethers, oleyl-di- or tri-ethylene glycol ethers and octodecyl-tri-ethylene glycol ether are particularly suitable for this purpose.

The said ethers are especially suitable for the preparation of aqueous pastes of oils, fats, ester-bearing waxes or paraffin waxes. In the preparation of thin aqueous emulsions it is preferable to employ the said ethers together with the usual dispersing agents, as for example with soaps, Turkey red oils, acid sulphuric esters of aliphatic alcohols of high molecular weight, such as those of dodecyl, tetradecyl, cetyl, or oleyl alcohols, or sulphonic acids of organic compounds of high molecular weight, such as palmitic sulphonic acid, stearic sulphonic acid, taurides, such as oleic-N-methyl tauride, (obtainable according to the British patents, Nos. 343,899 and 341,053) sulphonic acids of alkylated aromatic hydrocarbons or the water-soluble salts of these compounds.

The following examples will further illustrate the nature of this invention but the invention is not restricted to these examples. The parts are by weight.

Example 1

1 part of the ether obtainable by heating 1 molecular proportion of dodecyl alcohol and from 2 to 3 molecular proportions of ethylene oxide in a pressure-tight vessel at 160° C. with an addition of a small amount of caustic potash is mixed with 1 part of the sodium salt of the sulphuric ester of hydroxy-stearic acid. The resulting oil is soluble in water and is eminently suitable as a wetting or spot removing agent, as well as for scouring wool, as emulsifying agent, or for brightening or dressing textile materials.

Example 2

A mixture of 1 part of the ether obtainable by heating for three hours at 140° C. in a pressure-tight vessel 1 molecular proportion of octodecyl alcohol and 2 molecular proportions of ethylene oxide in the presence of sodium ethylate, and 1 part of a 40 per cent aqueous paste of the sodium salt of oleic-N-methyl tauride is slowly diluted with hot water while stirring continually. A stable emulsion is obtained which may be employed with advantage as a softening agent for textiles of all kinds, especially for artificial silk. If desired, the resulting mono-octodecyl ether of di-ethylene glycol may be etherified with dodecyl alcohol, the resulting mixed ether being applicable for the same purpose as the mono-octodecyl ether.

The sodium salt of hydroxy-octodecane sulphonic acid or a highly sulphonated olive or castor oil, such as the sulphuric ester of hydroxy-stearic acid, may be employed with equal softening effect instead of the oleic-N-methyl tauride.

Example 3

20 parts of paraffin oil, 10 parts of hard paraffin wax, 20 parts of petroleum jelly and 10 parts of the product obtained by reacting 2 molecular proportions of ethylene oxide with 1 molecular proportion of dodecyl alcohol in a closed vessel at 160° C., are fused together and 40 parts of water of about 50° to 60° C. are stirred slowly into the mixture. A homogeneous stable paste is obtained which may be employed for example as a skin cream.

Example 4

2 parts of octodecyl stearate

($C_{17}H_{35}$—COO—$C_{18}H_{37}$)

are fused with 3 parts of octodecyl alcohol and 5 parts of the product prepared by treating 3 molecular proportions of ethylene oxide with 1 molecular proportion of oleyl alcohol at 120° C. in the presence of a little caustic soda in a closed vessel. The mixture, while still hot, is introduced slowly, while stirring continually, into a solution of 18 parts of water and 2 parts of Marseilles soap, the soap solution being kept at about 60° to 70° C. The resulting mass is then diluted with 20 parts of water at the same temperature. In this manner a homogeneous, stable emulsion is obtained which may be readily further diluted by the addition of water and which emulsions may be employed for example for dressing.

Example 5

1 part of the product obtainable by the action of from 2 to 3 molecular proportions of ethylene oxide on 1 molecular proportion of oleyl alcohol is fused with about 6 parts of a solid polymerization product of ethylene oxide which has been prepared by the polymerization of ethylene oxide in the presence of caustic alkali as described for example in the British Patent No. 346,550. The resulting mixture is suitable, by reason of its protective colloid action, especially as an assistant in dyeing because it prevents the precipitation of calcium soaps and at the same time effects a level dyeing.

Example 6

A printing paste is prepared from 30 parts of Acid Violet 4 BC (Schultz, Farbstofftabellen, 1931, page 339, No. 806), 50 parts of glycerine, 500 parts of British gum in water (1:1), 20 parts of a condensation product from 1 molecular proportion of dodecyl or oleyl alcohol and from 2 to 3 molecular proportions of ethylene oxide and 380 parts of water.

The mixture is warmed for 10 minutes and then 20 parts of ammonium oxalate are added. Wool muslin is printed in the usual manner with the said paste, dried and steamed moist for an hour. A deep and level print is thus obtained even on non-chlorinated wool.

Example 7

3 molecular proportions of gaseous ethylene oxide are introduced at 130° C. into a stirring vessel containing a mixture of 1 molecular proportion of oleyl alcohol with 1 per cent of its weight of caustic soda. An oily product, consisting mainly of the mono-oleyl ether of tri-ethylene glycol, is obtained which is particularly suitable for the production of aqueous emulsions of water-insoluble oils and fats, such as olive oil or mineral lubricating oils. If for example olive oil or a mineral lubricating oil is homogeneously mixed with 5 per cent of its weight of the aforesaid ether and the mixture is stirred with 5 times by weight of water, stable emulsions are obtained which can be diluted with any further quantities of water without breaking the emulsion. If fungicidal or insecticidal substances are added at any stage to such mineral oil emulsions valuable compositions for combating plant pests are obtained.

What we claim is:—

1. Dispersing, wetting, cleansing and softening agents suitable as assistants in the textile and related industries consisting essentially of an ether of one glycol selected from the group consisting of di-ethylene glycol and tri-ethylene glycol one hydroxyl group thereof being etherified with one unsaturated aliphatic radicle containing at least 8 carbon atoms.

2. Dispersing, wetting, cleansing and softening agents suitable as assistants in the textile and related industries consisting essentially of an ether of one glycol selected from the group consisting of di-ethylene glycol and tri-ethylene glycol one hydroxyl group thereof being etherified with one unsaturated aliphatic radicle containing from 8 to 18 carbon atoms.

3. An ether, suitable for use as a dispersing agent, of an aliphatic unsaturated monohydric alcohol, containing from 12 to 18 carbon atoms, with a glycol selected from the group consisting of di-ethylene glycol and tri-ethylene glycol.

4. An ether, suitable for use as a dispersing agent, of oleyl alcohol, with a glycol selected from the group consisting of di-ethylene glycol and tri-ethylene glycol.

CONRAD SCHOELLER.
JOSEPH NUESSLEIN.